Patented Feb. 12, 1924.

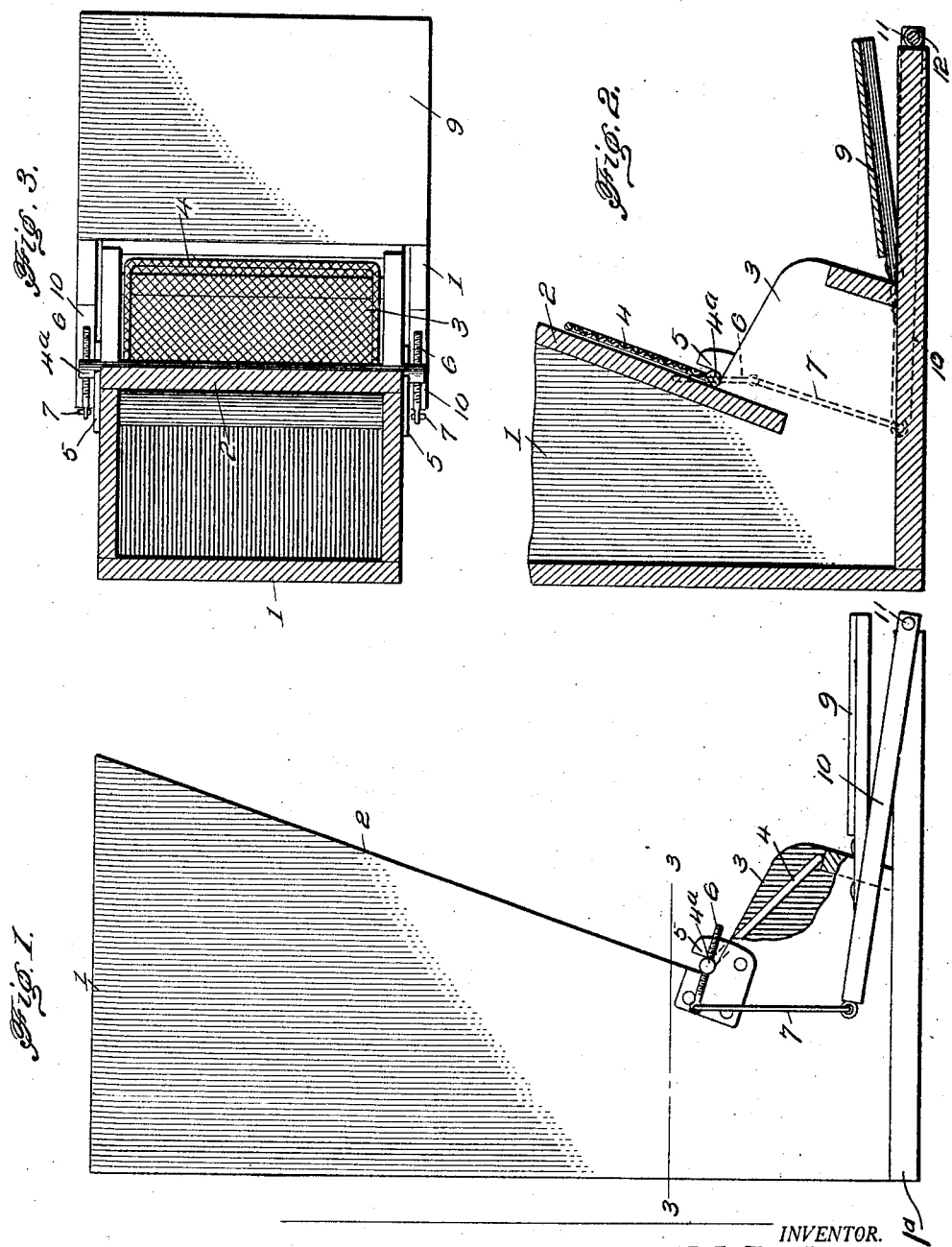

1,483,683

UNITED STATES PATENT OFFICE.

JAMES L. RUSH, OF MEMPHIS, TENNESSEE.

POULTRY FEEDER.

Application filed August 10, 1920. Serial No. 402,591.

*To all whom it may concern:*

Be it known that I, JAMES L. RUSH, a citizen of the United States, residing at Memphis, in the county of Shelby and State of Tennessee, have invented certain new and useful Improvements in a Poultry Feeder, of which the following is a specification.

This invention relates to feeders for poultry and the like of the type wherein the weight of the fowl is utilized to uncover the trough at the approach of the fowl and which is automatically closed when the fowl retires.

The object of the invention is to provide a feed box of this character in which bait is displayed so as to be seen by an approaching fowl or animal to attract them to step onto a movable member and thereby open a door to afford access to the feed and yet the feed is protected against birds, mice and the like when the feeder is not being used by the legitimate users.

Another object is to provide a cheap, simple and efficient apparatus of this character which holds and supplies any kind of grain and which prevents the fowls from wasting the feed.

With these and other objects in view, the invention consists in certain novel features of construction as hereinafter shown and described and then specifically pointed out in the claim and in the drawings illustrative of the preferred embodiment of the invention.

In the accompanying drawings:

Figure 1 represents a side elevation of a feeder constructed in accordance with this invention, parts being broken out and a transverse cover shown closed.

Fig. 2 is a vertical sectional view with the cover open with parts broken off, and, Fig. 3 is a detail transverse section taken on the line 3—3 of Fig. 1.

In the embodiment illustrated a base plate 1$^a$ having a food hopper 1 mounted thereon is shown said hopper having an inclined front wall 2 at the lower end of which is located an extension chamber 3 into which the feed from the hopper flows. This chamber 3 is shown open at its upper end and provided with a transparent upwardly open closure 4 here shown in the form of a wire mesh cover reinforced around its edges by a metal band and hinged in bearings 5 carried by the opposite sides of the receptacle 1, a pintle 4$^a$ being here shown fixed to the closure and mounted in said bearings with the ends thereof projecting beyond opposite sides of the hopper. This pintle 4$^a$ is arranged adjacent the inclined front wall of the hopper so that when the closure 4 is swung to open position it cannot reach its dead center (see Fig. 2) and thereby insuring its dropping by gravity to closed position when the opening force is relieved as will be presently described. Adjustably mounted in the ends of the pintle 4$^a$ are threaded cross rods 6, to one end of each of which is connected a flexible element 7, which also is connected with the rear ends of arms 10 carrying a tilting platform 9 which is secured to said arms in rear of their centers or midlengths. The platform supporting arms 10 are shown hinged at their front ends on a pintle 11 mounted in suitable bearings on the base 1$^a$ which supports the hopper 1, the base having a bearing 12 through which said pintle extends. The platform is arranged adjacent the front of the extension chamber 3 and is normally held flush with the upper edge of the front wall of said chamber as shown in Fig. 1, the weight of the closure 4 operating to hold it in this position. The rods 6 are adjustable to adapt the platform to be tilted by fowls of different weights.

While the closure 4 is shown constructed of wire mesh it may be made of any suitable transparent material so that the feed contained in chamber 3 may be easily seen by a fowl approaching said chamber. This display of the feed will entice the fowl to step onto the platform 9, the free end of which will move downwardly carrying with it the arms 10 which span the chamber 3 and are connected with the cross bars 6 by the cables 7. This downward movement of these arms will exert a pull on the cables 7 and open the closure 4 swinging it upwardly into the position shown in Fig. 2.

When this closure is open the fowl or animal which has stepped on the platform 9 and produced this effect may feed from chamber 3 and when he steps off the platform the weight of the door or closure 4 will cause it to drop by gravity into the position shown in Fig. 1 thereby elevating the platform and positioning it ready for the next fowl to be fed. When the cover is in closed position it will shut out illegitimate feeders such as birds, mice and the like and thereby prevent waste of the feed.

This apparatus while very cheap in construction and simple in operation will be equally as effective as more expensive apparatus of this character and owing to the few parts embodied in its construction it will not easily be broken or rendered inoperative.

The preferred embodiment of the invention is disclosed in the drawings and set forth in the specification, but it will be understood that any modifications within the scope of the claim may be made in the construction without departing from the principle of the invention or sacrificing any of its advantages.

What I claim is:

A feeding device comprising a feed containing hopper including a base and side walls, each of said sides having its lower portion extending forwardly and downwardly to provide a feed trough, and further having its base extended beyond said trough, bearings mounted upon said walls and extending forwardly of the front edge thereof at the angle formed to provide the trough, a closure carrying shaft extending across the face of said hopper and having its ends mounted in said bearings, each end of said shaft being provided with a transverse bore, cross rods mounted in said bores, a pair of rearwardly and upwardly extending shiftable side arms pivotally mounted at the front edge of said base, link connecting means between the inner ends of said arms and said cross rods, and a platform carried by said arms.

In testimony whereof, I affix my signature hereto.

JAMES L. RUSH.